(12) United States Patent
Allard et al.

(10) Patent No.: US 7,790,802 B2
(45) Date of Patent: Sep. 7, 2010

(54) COATING MATERIAL, METHOD FOR PRODUCTION AND USE THEREOF FOR THE PRODUCTION OF ADHESIVE TONE AND/OR EFFECT-GENERATING COATINGS

(75) Inventors: Maxime Allard, Dachstein (FR); Dominique Kauffer, Drensteinfurt (DE)

(73) Assignee: BASF Coatings Aktiengesellschaft, Munster (DE)

( * ) Notice: Subject to any disclaimer, the term of this patent is extended or adjusted under 35 U.S.C. 154(b) by 464 days.

(21) Appl. No.: 11/915,438

(22) PCT Filed: May 16, 2006

(86) PCT No.: PCT/EP2006/062333

§ 371 (c)(1),
(2), (4) Date: Nov. 26, 2007

(87) PCT Pub. No.: WO2006/125734

PCT Pub. Date: Nov. 30, 2006

(65) Prior Publication Data

US 2009/0281208 A1      Nov. 12, 2009

(30) Foreign Application Priority Data

May 27, 2005   (DE)   ..................  10 2005 024 381

(51) Int. Cl.
| | |
|---|---|
| *A61K 6/083* | (2006.01) |
| *B29C 71/04* | (2006.01) |
| *B29C 73/16* | (2006.01) |
| *B29D 11/00* | (2006.01) |
| *B32B 17/10* | (2006.01) |
| *B41M 7/00* | (2006.01) |
| *B60C 1/00* | (2006.01) |
| *C03C 25/10* | (2006.01) |
| *C08F 2/08* | (2006.01) |
| *C08F 2/46* | (2006.01) |
| *C08F 283/04* | (2006.01) |
| *C08G 18/08* | (2006.01) |
| *C08G 18/42* | (2006.01) |
| *C08G 18/67* | (2006.01) |
| *C08J 3/22* | (2006.01) |
| *C08K 3/34* | (2006.01) |
| *C08L 41/00* | (2006.01) |
| *C08L 43/00* | (2006.01) |
| *C08L 51/00* | (2006.01) |
| *C08L 67/00* | (2006.01) |
| *C08L 71/02* | (2006.01) |
| *C08L 75/00* | (2006.01) |
| *C08L 77/00* | (2006.01) |
| *C08L 91/08* | (2006.01) |
| *D21H 19/18* | (2006.01) |
| *H05B 6/68* | (2006.01) |

(52) U.S. Cl. .............................. 524/590; 522/1; 522/71; 522/74; 522/77; 522/104; 522/107; 522/178; 524/462; 524/474; 524/478; 524/487; 524/488; 524/492; 524/493; 524/507; 524/589; 524/852; 525/404; 525/408; 525/445; 525/455

(58) Field of Classification Search .................... 522/1, 522/71, 74, 77, 90, 91, 96, 99, 104, 107, 522/178; 524/462, 474, 478, 487, 488, 492, 524/493, 507, 539, 588, 589, 590, 852; 525/404, 525/408, 409, 445, 455
See application file for complete search history.

(56) References Cited

U.S. PATENT DOCUMENTS

2003/0072943 A1   4/2003   Anderson et al.

FOREIGN PATENT DOCUMENTS

| GB | 989201 A | 4/1965 |
| JP | 2002-012635 | * 1/2002 |

OTHER PUBLICATIONS

International Search Report for PCT/EP2006/062333 dated Sep. 5, 2006.

Anonymous: "Technical data sheet CN152" Sartomer Technical Datasheets, [Online] Dec. 2000, p. 2450, XP002391755, Retrieved from the Internet: URL:http://www.sartomer.com/wpapers/2450.pdf [retrieved on Jul. 24, 2006].

(Continued)

*Primary Examiner*—Patrick D Niland
(74) *Attorney, Agent, or Firm*—Cantor Colburn LLP

(57) ABSTRACT

Disclosed herein is a liquid coating material curable with actinic radiation, substantially or entirely free from organic solvents, comprising (A) at least two compounds of general formula X—O—Y(—OH)—Z-Gr wherein X is a $C_6$-$C_{14}$ aromatic radical, $C_5$-$C_{20}$ heterocyclic aromatic radical or $C_6$-$C_{30}$ alkyl radical, Y is a trivalent organic radical, Z is a linking functional group, and Gr is an organic radical comprising one group which can be activated with actinic radiation; with the proviso that at least one of the two compounds (A) comprises aromatic or heterocyclic aromatic radical X and at least one comprises alkyl radical X; (B) oligo- and polyurethanes and/or oligo- and polyesters comprising two or three groups which can be activated with actinic radiation; (C) color and/or effect pigments; (D) waxes; (E) matting agents; and (F) polysiloxane additives comprising groups which can be activated with actinic radiation, a process for preparing it, and use thereof.

25 Claims, No Drawings

OTHER PUBLICATIONS

Anonymus: "Techincal Data Sheet: CN131B", Sartomer Technical Datasheets, [Online] August 2003, p. 2564, XP002391756, Retrieved from the Internet: URL:http//www.sartomer.com/wpapers/2564.pdf [retrieved on Jul. 24, 2006].

International Preliminary Report on Patentability, International Application No. PCT/EP2006/062333, International Filing Date: May 16, 2006, 6 pages.

Database CA [Online], Chemical Abstracts Service, Columbus, Ohio, US; Feb. 4, 1989 Sato, Toshiaki et al. "Activated energy beam-curable coating compositions with improved adhesion", XP002395573 retrieved from STN Database accession No. 1989:40580 abstract & JP 63 146968A (Toyo Ink Mfg. Co., Ltd., Japan) Jun. 18, 1988.

* cited by examiner

COATING MATERIAL, METHOD FOR PRODUCTION AND USE THEREOF FOR THE PRODUCTION OF ADHESIVE TONE AND/OR EFFECT-GENERATING COATINGS

CROSS REFERENCE TO RELATED APPLICATIONS

This application is a National Phase Application of Patent Application PCT/EP2006/062333, filed on May 16, 2006, which claims priority to DE 10 2005 024 381.9-43, filed on May 27, 2005.

FIELD OF THE INVENTION

The present invention relates to a new coating material curable with actinic radiation. The present invention also relates to a new process for preparing a coating material curable with actinic radiation. The present invention further relates to the use of the new coating material or of the coating material produced by means of the new process for producing firmly adhering color and/or effect coatings, especially coil coatings, more particularly topcoats on primer coats.

BACKGROUND

Firmly adhering color and/or effect coatings on metal strips, or coils, particularly those consisting of the conventional utility metals, such as zinc, aluminum or bright, galvanized, electrolytically zincked, and phosphated steel, are produced preferably by means of the coil coating process (Römpp Lexikon Lacke und Druckfarben, Georg Thieme Verlag, Stuttgart, N.Y., 1998, page 617, "roll coating", and page 55, "coil coating"; A. Goldschmidt and H.-J. Streitberger, BASF-Handbuch Lackiertechnik, Vincentz Verlag, Hanover, 2002, "4.2.1.2 brushing, rolling, roller, flow, and casting methods (coating materials directly to the object)", pages 521 to 527, especially 523, and "7.4 Coil Coating", pages 751 to 756).

Where highly pigmented topcoats which are matt and/or of only slight gloss are to be produced, it is advisable for that purpose to use coating materials which can be cured with actinic radiation and which can preferably be cured rapidly by means of electron beams (EBC) (cf., e.g., B. A. Goldschmidt and H.-J. Streitberger, BASF-Handbuch Lackiertechnik, Vincentz Verlag, Hanover, 2002, pages 638 to 641). On account of the high pigment content, curing with UV radiation is difficult if not impossible.

Coil coating processes for producing color and/or effect coatings, where first a primer film is applied to the coils and is partly or fully cured, and then a topcoat film is applied and, alone or together with the primer film, is cured fully with actinic radiation, are known.

Here and below, actinic radiation means electromagnetic radiation, such as near infrared (NIR), visible light, UV radiation, X-rays, and gamma radiation, especially UV radiation, and also corpuscular radiation, such as electron beams, beta radiation, alpha radiation, proton beams, and neutron beams, especially electron beams.

For example, in the case of the process known from U.S. Pat. No. 3,959,521, the first film applied to the coils is a primer film comprising olefinically unsaturated double bonds and free isocyanate groups. The primer film can be cured with electron beams or UV radiation to give the primer coat. Applied atop the primer coat is a substantially solvent-free, pigmented topcoat material based on polyesters which contain two acrylate groups. The resulting topcoat film is cured with electron beams to give the topcoat.

In the similar process known from German patent application DE 44 21 558 A1 the pigmented topcoat material comprises prepolymers containing acrylate groups, such as polyurethane acrylates, polyester acrylates, polyether acrylates, epoxy acrylates or full acrylates, or mixtures thereof, which may have been blended with low-viscosity reactive diluents. The topcoat material may further comprise unspecified organic, inorganic or metallic fillers, matting agents, rheological additives, waxes, flow control agents, lubricants, devolatilizers, defoamers, adhesion promoters, dispersing assistants, wetting agents, antisettling agents, antistats, stabilizers, light stabilizers, corrosion inhibitors, and other substances known to the skilled worker, individually or in a mixture.

In the case of the similar process known from International patent application WO 01/32321 A2 a topcoat material curable with UV radiation or electron beams is applied to a thermally curable basecoat film or thermally cured basecoat. The topcoat material comprises oligomers or polymers which contain acrylate, styrene, vinyl and/or allyl groups, preferably acrylate groups. Preference is given to using polyacrylates, urethane acrylates, epoxy acrylates, polyester acrylates and/or amino acrylates. The topcoat material may be solvent-free or may include solvent. It may further comprise reactive diluents (monomers), such as isobornyl acrylate, etc., and adhesion promoters.

The known processes yield color and/or effect coatings which are firmly adhering, hard, flexible, and deformable, and which are said to afford effective corrosion control.

In terms of energy consumption and their belt speed, however, it is necessary to further improve the known coil coating processes, in order to satisfy the continually growing requirements of the market, particularly of coil coaters.

The coating materials that are employed in this field must likewise be continually further improved in terms of their preparation, storage stability, and handling, including their application.

Similarly, the known, color and/or effect coatings produced with these materials must likewise be further improved in their hardness, flexibility, deformability, substrate adhesion, intercoat adhesion, and corrosion control effect, in order to satisfy the likewise continually growing demands of the coil coaters' industrial customers.

SUMMARY

The present invention provides a new, pigmented, liquid coating material which is curable with actinic radiation, especially electron beams, and is substantially or entirely free from organic solvents, which no longer has the disadvantages of the prior art but instead is easy to prepare, of high reactivity, and has a high pigment content and yet is stable on storage, which is particularly easy and trouble-free to apply, particularly as part of the coil coating process, and can be cured at low curing temperatures very rapidly and without emitting volatile organic compounds. In particular the new coating material has very little, if any, thixotropic behavior.

The coatings produced from this coating material, especially the coil coatings, more particularly the topcoats, have particularly high intercoat adhesion to the underlying coatings, especially the primer coats, and have an outstanding corrosion control effect. They are particularly hard, particularly flexible, and particularly well deformable. They have a particularly high pigment content and a high coat thickness without incidence of coating defects. They exhibit a very good matting effect.

In particular the new coatings, especially the new coil coatings, more particularly the topcoats, achieve at least an ECCA (European Coil Coating Association) classification of 6 (cf. A. Goldschmidt and H.-J. Streitberger, BASF-Handbuch Lackiertechnik, Vincentz Verlag, Hanover, 2002, "7.4 Coil Coating", pages 751 to 756, especially 754), i.e., they ought in particular, at a coat thickness of 20 µm, they obtain a value ≦1.5 in the T-bend test and a value ≦0.5 in the tape test. In addition they exhibit a uniform, matt gloss (60° of 30% to 40% and have a corrosion resistance in the salt spray test of at least 21 days.

This particularly advantageous profile of performance properties of the new coatings produced from the new coating material is obtainable even when the new coating material is cured by means of EBC, especially under inert conditions.

The new, liquid coating material curable with actinic radiation, substantially or entirely free from organic solvents, comprises (A) at least two compounds of the general formula I:

in which the variables have the following definitions:
X is an aromatic radical of 6 to 14 carbon atoms, heterocyclic aromatic radical of 5 to 20 ring atoms or alkyl radical of 6 to 30 carbon atoms,
Y is a trivalent organic radical,
Z is a linking functional group, and
Gr is an organic radical containing at least one group which can be activated with actinic radiation;
with the proviso that at least one of the at least two compounds (A) contains an aromatic or heterocyclic aromatic radical X (=compound A1) and at least one of the at least two compounds (A) contains an alkyl radical X (=compound A2);

(B) at least one oligomer and/or polymer which can be activated with actinic radiation and is selected from the group consisting of oligo- and polyurethanes and oligo- and polyesters containing on average at least two groups which can be activated with actinic radiation;

(C) at least one constituent selected from the group consisting of color and/or effect pigments;

(D) at least one wax;

(E) at least one matting agent; and (F) at least one polysiloxane additive containing at least on average at least one group which can be activated with actinic radiation.

The new coating material is referred to below as the "coating material of the invention".

Also found has been the new process for preparing the coating material of the invention, which involves mixing constituents (A) to (F) of the coating material of the invention with one another and homogenizing the resulting mixture.

The new process is referred to below as the "process of the invention".

Additional subject matter of the invention will emerge from the description.

DETAILED DESCRIPTION

In the light of the prior art it was surprising and unforeseeable for the skilled worker that the object on which the present invention was based could be achieved by means of the coating material of the invention and of the process of the invention.

In particular it was surprising that the coating material of the invention no longer exhibited the disadvantages of the prior art but instead could be prepared easily and very reproducibly, the process of the invention allowing a particularly economic and eco-friendly preparation.

The coating material of the invention was highly reactive and also demonstrated outstanding stability on storage and capacity for transportation in the case of a particularly high pigment content. It showed very little, if any, thixotropic behavior, i.e., behavior not disrupting handling and application, and was particularly easy and trouble-free to apply, particularly as part of the coil coating process, and could be cured at low curing temperatures, very rapidly and without emitting volatile organic compounds.

The new coatings produced from this coating material, especially the new coil coatings, more particularly the new topcoats, had particularly high intercoat adhesion to the underlying coatings, especially the primer coats, and an outstanding corrosion control effect. They were particularly hard, particularly flexible, and particularly well deformable. They allowed a particularly high pigment content and a high coat thickness without incidence of coating defects. Not least, they displayed a very good matting effect.

In particular the new coatings, especially the new coil coatings, more particularly the topcoats, achieved at least an ECCA (European Coil Coating Association) classification of 6 (cf. A. Goldschmidt and H.-J. Streitberger, BASF-Handbuch Lackiertechnik, Vincentz Verlag, Hanover, 2002, "7.4 Coil Coating", pages 751 to 756, especially 754), i.e., in particular, at a coat thickness of 20 µm, they achieved a value ≦1.5 in the T-bend test and a value ≦0.5 in the tape test. Additionally they exhibited a uniform matt gloss (60°) of 30% to 40%. In the salt spray test they showed corrosion resistance of at least 21 days.

This particularly advantageous profile of performance properties of the coatings of the invention produced from the coating material of the invention was obtained, in particular, even when the coating material was cured by means of EBC, especially under inert conditions.

Surprisingly, the coatings of the invention exhibited high weathering stability and yellowing resistance even without light stabilizers.

The coating material of the invention is liquid: that is, although it does include solid, nonliquid constituents, it is nevertheless in a fluid state at room temperature and under the conventional conditions of preparation, storage, and application, and so can be processed by means of the conventional application methods employed in the coil coating process.

Given an appropriate composition, the coating material of the invention can be in the form of a water-in-oil dispersion, in which the discontinuous aqueous phase is finely dispersed in the continuous organic phase. The diameter of the droplets in the aqueous phase can vary widely; preferably this diameter is 10 nm to 1000 µm, in particular 100 nm to 800 µm. The constituents of the coating material of the invention are then distributed between the aqueous phase and organic phase in accordance with their hydrophilicity or hydrophobicity (cf. Römpp Online, 2002, "hydrophobicity", "hydrophilicity"), or are present as a separate, solid phase.

The coating material of the invention or its aqueous phase, as a water-in-oil dispersion, may have preferably a pH <5, more preferably <4, and in particular from 3 to 3.5. The coating material of the invention is substantially or entirely free from organic solvents. This means that its organic solvent content is <5%, preferably <3%, and more preferably <1% by weight. In particular the amount is below the detection limits of the conventional qualitative and quantitative detection methods for organic solvents.

The coating material of the invention comprises at least two, especially two, compounds (A) of the general formula I:

X—O—Y(—OH)—Z-Gr    (I).

In this formula the variables have the following definitions:

X is an aromatic radical of 6 to 14, preferably 6 to 10, carbon atoms, heterocyclic aromatic radical of 5 to 20, preferably 6 to 10, ring atoms or alkyl radical of 6 to 30, preferably 8 to 20, in particular 10 to 16, carbon atoms; preferably it is an aromatic radical of 6 to 10 carbon atoms or alkyl radical of 10 to 16 carbon atoms; in particular it is a phenyl radical or lauryl radical;

Y is a trivalent organic radical, preferably aliphatic radical, more preferably aliphatic radical having three carbon atoms, especially 1,2,3-propanetriyl;

Z is a linking functional group, preferably selected from the group consisting of ether, thioether, carboxylic ester, thiocarboxylic ester, carbonate, thiocarbonate, phosphoric ester, thiophosphoric ester, phosphonic ester, thiophosphonic ester, phosphite, thiophosphite, sulfonic ester, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone, sulfoxide, and siloxane groups. Preferred among these groups are the ether, carboxylic ester, carbonate, carboxamide, urea, urethane, imide, and carbonate groups, particular preference being given to a carboxylic ester group, and especial preference being given to a carboxylic ester group linked to the radicals Y and Gr in accordance with the general formula II:

>Y—O—(O=)C-Gr    (II);

and

Gr is an organic radical containing at least one, especially one, group which can be activated with actinic radiation;

with the proviso that at least one, especially one, of the at least two, especially two, compounds (A) contains an aromatic or heterocyclic aromatic, especially aromatic, radical X (=compound A1) and at least one, especially one, of the at least two, especially two, compounds (A) contains an alkyl radical X (=compound A2).

The groups which can be activated with actinic radiation contain at least one, especially one, bond which can be activated with actinic radiation. By this is meant a bond which, on exposure to actinic radiation, becomes reactive, and together with other activated bonds of its kind, enters into polymerization reactions and/or crosslinking reactions which proceed in accordance with free-radical and/or ionic mechanisms. Examples of suitable bonds are single carbon-hydrogen bonds or single or double carbon-carbon, carbon-oxygen, carbon-nitrogen, carbon-phosphorus or carbon-silicon bonds, or else triple carbon-carbon bonds. Of these bonds, the double and triple carbon-carbon bonds are advantageous and are therefore used with preference in accordance with the invention. Particularly advantageous are the double carbon-carbon bonds, and so they are used with particular preference. For the sake of brevity they are referred to below as "double bonds".

The double bonds are preferably contained in organic radicals Gr of the general formula III:

In the general formula III the variables have the following definitions:

R is a single bond to an atom of the above-described linking functional group Z, particularly a single carbon-carbon bond to the carbon atom of a carbonyloxy group, or divalent organic radical, preferably single carbon-carbon bond; and $R^1$, $R^2$ and $R^3$ are each a hydrogen atom or organic radical;

it being possible for at least two of the radicals R, $R^1$, $R^2$ and $R^3$ to be linked cyclically to one another.

Examples of suitable divalent organic radicals R include or consist of alkylene, cycloalkylene and/or arylene groups. Highly suitable alkylene groups contain one carbon atom or 2 to 6 carbon atoms. Highly suitable cycloalkylene groups contain 4 to 10, especially 6, carbon atoms. Highly suitable arylene groups contain 6 to 10, especially 6, carbon atoms.

Examples of suitable organic radicals $R^1$, $R^2$ and $R^3$ include or consist of alkyl-, cycloalkyl- and/or aryl groups. Highly suitable alkyl groups contain one carbon atom or 2 to 6 carbon atoms. Highly suitable cycloalkyl groups contain 4 to 10, especially 6, carbon atoms. Highly suitable aryl groups contain 6 to 10, especially 6, carbon atoms.

The organic radicals R, $R^1$, $R^2$ and $R^3$ can be substituted or unsubstituted. The substituents, however, must not disrupt the conduct of the process of the invention and/or inhibit activation of the groups with actinic radiation. Preferably the organic radicals R, $R^1$, $R^2$ and $R^3$ are unsubstituted.

Examples of the specially suitable radicals Gr of the general formula III are vinyl-, 1-methylvinyl-, 1-ethylvinyl-, propen-1-yl, styryl-, cyclohexenyl-, endomethylenecyclohexyl-, norbornenyl- and dicyclopentadienyl groups, especially vinyl groups.

Accordingly the particularly preferred radicals

—Z-Gr    (IV)

are (meth)acrylate-, ethacrylate-, crotonate-, cinnamate-, cyclohexenecarboxylate-, endomethylenecyclohexanecarboxylate-, norbornenecarboxylate-, and dicyclopentadienecarboxylate groups, preferably (meth)acrylate groups, especially acrylate groups.

Examples of particularly advantageous compounds A1 are phenyl glycidyl ether monoacrylates, as sold, for example, by Cray Valley under the name Aromatic Epoxy Acrylate CN 131B.

Examples of particularly advantageous compounds A2 are laurylglycidyl ether monoacrylates, as sold, for example, by Cray Valley under the name Aliphatic Epoxy Acrylate Monofunctional CN152, or the $C_{12}$-$C_{14}$-glycidyl ether monoacrylate, sold by Huntsman Vantico Europe under the name LMB 6365.

The amount of the compounds (A) in the coating material of the invention may vary widely and be discharged with the requirements of the case in hand.

Preferably the amount of (A1), based in each case on the coating material of the invention, is 5% to 30%, more preferably 8% to 25%, and in particular 10% to 20% by weight. Preferably the amount of the compounds (A2), based in each case on the coating material of the invention, is 5% to 30%, more preferably 8% to 25%, and in particular 10% to 20% by weight. Preferably the weight ratio of (A1) to (A2) is 4:1 to 1:4, more preferably 3:1 to 1:3, very preferably 2:1 to 1:2, and in particular 1.2:1 to 1:1.2.

The coating material of the invention comprises at least one, especially one, oligomer and/or polymer (B) which can be activated with actinic radiation.

For the purposes of the present invention an oligomer is a compound composed of 2 to 12 monomeric structural units which may be identical to or different from one another. A polymer is a compound which is composed of more than 8, in particular more than 12, monomeric structural units, which may be identical to or different from one another. Whether a compound composed of 8 to 12 monomeric structural units is regarded as an oligomer or polymer by the skilled worker in any given case depends in particular on the molecular weight of the compound in question.

The oligomers and polymers (B) are selected from the group consisting of oligo- and polyurethanes and oligo- and polyesters which contain on average at least two, preferably two or three, especially two, groups which can be activated with actinic radiation. Examples of suitable groups which can be activated with actinic radiation are the above-described radicals of the general formula (IV), preferably (meth)acrylate groups, especially acrylate groups.

The oligomers and polymers (B) preferably contain terminal (meth)acrylate groups, especially terminal acrylate groups.

The oligomers and polymers (B) with terminal acrylate groups preferably have linear oligomer or polymer main chains.

Preferably the oligomer or polymer main chains contain primarily aliphatic or cycloaliphatic structural units.

The oligomers and polymers (B) are conventional, commercially available, compounds which can be prepared from the conventional starting compounds for the preparation of polyurethanes (polyisocyanates and polyols) or polyesters (polycarboxylic acids and/or polycarboxylic acid derivatives and polyols) in accordance with the conventional processes.

Examples of especially suitable polyesters (B) are the following commercial products Ebecryl® 80 and RD09/409 from UCB;
Photomer® 5029 and 5432 from Cognis;
Laromer® P55 from BASF Aktiengesellschaft; or
Craynor® 704 from Sartomer Europe.
In particular, Craynor® 704 is used.
Examples of especially suitable polyurethanes (B) are the following commercial products
Roskydal® 2513, XP2571, 2258, WDJ 4084 or WDJ 4083 from Bayer Aktiengesellschaft;
Actilane® 170, 280, 290 or RCP4698 from Akzo;
Photomer® 6010, 6210, 6891, 6230, 6623 or 6613 from Cognis;
CN 965, 962, 963, 966 or 9001 from Sartomer Europe; or
CA-28/12-C or CAQ 32/00 from Uracriresins.
Use is made in particular of mixtures (B) of
Photomer® 6613 and Roskydal® 4084,
Roskydal® 4083 and 4084 or
Photomer® 6613 and Actilane® RCP4698 preferably each in a weight ratio of 4:1 to 1:4, more preferably 3:1 to 1:3, very preferably 2:1 to 1:2, and in particular 1.2:1 to 1:1.2.

The amount of constituent (B) in the coating material of the invention may vary very widely and is guided by the requirements of the case in hand, in particular by the viscosity that is needed in each case for the handing and application of the coating material of the invention. Preferably the coating material of the invention, based in each case on its total amount, contains 10% to 50%, more preferably 15% to 40%, and in particular 20% to 30% by weight (B).

The coating material of the invention further comprises at least one constituent (C), selected from the group consisting of color and/or effect pigments, especially from the group consisting of organic and inorganic, colored and achromatic, optical effect, electrically conductive, magnetically shielding, and fluorescent pigments.

Examples of suitable effect pigments (C), which may also provide color, are metal flake pigments, such as commercial aluminum bronzes, aluminum bronzes chromated in accordance with DE 36 36 183 A 1, and commercial stainless steel bronzes, and also non-metallic effect pigments, such as pearlescent pigments and interference pigments, platelet-shaped effect pigments based on iron oxide with a color from pink to brownish red, or liquid-crystalline effect pigments, for example. For further details refer to Römpp Lexikon Lacke und Druckfarben, Georg Thieme Verlag, 1998, page 176 "effect pigments", pages 380 and 381 "metal oxide-mica pigments" to "metal pigments", and page 438 "pearlescent pigments", "mother of pearl pigments", and to the patent applications and patents DE 36 36 156 A 1, DE 37 18 446 A 1, DE 37 19 804 A 1, DE 39 30 601 A 1, EP 0 068 311 A 1, EP 0 264 843 A 1, EP 0 265 820 A 1, EP 0 283 852 A 1, EP 0 293 746 A 1, EP 0 417 567 A 1, U.S. Pat. No. 4,828,826 A or U.S. Pat. No. 5,244,649 A.

Examples for suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments (C) are monoazo pigments, disazo pigments, anthraquinone pigments, benzimidazole pigments, quinacridone pigments, quinophthalone pigments, diketopyrrolo pyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke und Druckfarben, Georg Thieme Verlag, 1998, pages 180 and 181 "iron blue pigments" to "black iron oxide", pages 451 to 453 "pigments" to "pigment volume concentration", page 563 "thioindigo pigments", page 567 "titanium dioxide pigments", pages 400 and 467 "naturally occurring pigments", page 459 "polycyclic pigments", page 52 "azomethine pigments", "azo pigments" and page 379 "metal complex pigments".

Examples of fluorescent and phosphorescent pigments (C) (daylight-fluorescent pigments) are bis(azomethine) pigments.

Examples of suitable electrically conductive pigments (C) are titanium dioxide/tin oxide pigments.

Examples of magnetically shielding pigments are pigments (C) based on iron oxides or chromium dioxide.

Examples of suitable corrosion-inhibiting pigments (C) are lead silicates, zinc phosphates or zinc borates.

The amount of pigment (C) in the coating material of the invention may vary very widely and is guided in particular by the colors and/or effects which the coatings of the invention are to have. Preference is given to using the pigments (C) in the conventional amounts.

The coating material of the invention further comprises at least one, especially one, wax (D). Suitable in principle are all conventional waxes, as described for example in Römpp Lexikon Lacke und Druckfarben, Georg Thieme Verlag, Stuttgart, 1998, "waxes". The waxes (D) are preferably selected from the synthetic waxes, particularly from the group consisting of micronized polyolefin waxes and fluorinated polyolefin waxes, especially PTFE waxes. Waxes of this kind are conventional and are available commercially. Examples of suitable micronized waxes (D) are the following commercial products Synfluo® 180×F or Polyfluo® 400×F, MP611XF or MP21XF or Carnauba wax Mikroclear® 116 from Micropowder;

Zonyl® TE5119 from Du Pont De Nemours and Company;

Ceraflour® 980, 996 or 998 from Altana Chemie;

Nanoflon® P 51-A from Shamrock;

Pinnacle® 9001 from Lubrizol and

UV-curable wax TP5071 from Clariant.

Preference is given to using Polyfluo® 400×F or Carnauba wax Mikroclear® 116.

The coating material of the invention, based in each case on its total amount, contains preferably 0.1% to 3%, more preferably 0.5% to 2.5%, and in particular 1% to 2% by weight of wax (D).

The coating material of the invention further comprises at least one matting agent (E). Examples of suitable matting (or flatting) agents are known from the text book by Johan Bieleman, "Lackadditive" [Additives for coatings], Wiley-VCH, Weinheim, N.Y., 1998, "5.2 matting", pages 152 to 169. Preference is given to using amorphous silicas sold, for example, under the brand name Silcron® by the company SCM.

The amount of the matting agents (E) in the coating material of the invention may vary widely and is guided by the level of matting the coatings of the invention are to exhibit. It is, however, a very particularly advantage of the coating material of the invention that even with comparatively small amounts of matting agents (E) a good matting effect is obtained. Preferably the coating material, based in each case on its total amount, contains 1% to 15%, preferably 2% to 12%, and in particular 3% to 10% by weight (E).

The coating material of the invention further comprises at least one, preferably one, polysiloxane additive (F), containing on average at least one, in particular at least two, of the above-described groups which can be activated with actinic radiation. It is preferred to use conventional, dimethylpolysiloxane-based polysiloxane additives (F). Examples of suitable polysiloxane additives are the following commercial products:

Byk® 377, UV 3500 or UV 3570 from Altana Chemie;

Coatosil® 3503 or 3509 from OSI Specialties;

Tegorad® 2700, 2500 or 2200 from Tego Chemie; or

PA 29, 30 or 31, DC 18 or BY16-152 from Dow Corning.

Preference is given to using DC 18 or BY16-152 from Dow Corning.

The coating material of the invention comprises the polysiloxane additive (F) in the conventional, effective amounts. The amount, based in each case on the coating material of the invention, is preferably 0.1% to 3%, more preferably 0.5% to 2.5%, and in particular 0.5% to 2% by weight.

The coating material of the invention preferably comprises at least one reactive diluent (G) comprising at least one, especially one, of the above-described groups which can be activated with actinic radiation. By reactive diluent are meant reactive diluents or solvents, the term being an abbreviated form of the longer term, as laid down in DIN 55945: 1996-09, and describing diluents which in the course of film formation react chemically to become part of the binder. They comprise, in particular, olefinically unsaturated monomers having at least one, preferably one, double bond. For further details refer to Römpp Lexikon Lacke und Druckfarben, Georg Thieme Verlag, Stuttgart, N.Y., 1998, page 491, "reactive diluents".

Particularly preferred reactive diluents (G) used are isobornylacrylate or N-2-hydroxyethylimidazole methacrylate, or mixtures thereof, preferably in a weight ratio of 2:1 to 1:2, more preferably 1.5:1 to 1:1.5, and in particular 1.3:1 to 1:1.

The coating material of the invention preferably contains the reactive diluent or diluents (G), based in each case on the coating material of the invention, in an amount of 0.5% to 10%, more preferably 1% to 8%, and in particular 1.5% to 7% by weight.

The coating material of the invention preferably comprises at least one acidic ester (H) of polyphosphoric acid and at least one compound (h1) containing at least one hydroxyl group and at least one group which can be activated with actinic radiation, such as are described, for example, in German patent application DE 102 56 265 A1, page 7, paragraphs [0057] to [0062], in conjunction with page 6, paragraphs [0044] and [0045]. The diphosphorus pentoxide content of the polyphosphoric acid may vary widely; preferably it is 60% to 95%, more preferably 70% to 95%, and in particular 70% to 90% by weight. The acidic ester (H) is used preferably in an amount, based in each case on the coating material of the invention, of 0.1% to 5%, more preferably 0.5% to 4%, and in particular 1% to 3% by weight.

The coating material of the invention may comprise at least one conventional additive (J) in effective amounts. Examples of suitable additives (J) are known from the textbook by Johan Bieleman, "Lackadditive", Wiley-VCH, Weinheim, N.Y., 1998. Preferably the additives (J) are selected from the group consisting of water; polyphosphoric acid; phosphonic acids containing at least one group which can be activated with actinic radiation; acidic esters of monophosphoric acid and at least one compound containing at least one hydroxyl group and at least one group which can be activated with actinic radiation (h1); dryers; transparent and opaque, organic and inorganic fillers; nanoparticles; thermally or physically curable, oligomeric and polymeric binders; UV absorbers; light stabilizers; free-radical scavengers; photoinitiators; devolatilizers; slip additives; polymerization inhibitors; defoamers; emulsifiers; wetting agents; adhesion promoters; flow control agents; film-forming auxiliaries; rheology control additives; and flame retardants.

The coating material of the invention is prepared preferably by means of the process of the invention, by mixing the above-described constituents (A) to (F) and also, where used, (G) to (J), preferably in suitable mixing apparatus, such as stir tanks, agitator mills, extruders, compounders, Ultraturrax devices, in-line dissolvers, static mixers, micromixers, toothed-wheel dispersers, pressure release nozzles and/or microfluidizers. It is preferred here to operate in the absence of light with a wavelength λ<550 nm or with complete exclusion of light, in order to prevent premature crosslinking of the constituents containing groups which can be activated with actinic radiation.

Preferably the coating material of the invention is prepared by
(1) preparing a mixture containing constituents (A), (B) and (F) and also, where used, constituents (G) and/or (H) and/or a small fraction of constituent (D),
(2) dispersing constituent (C) and constituent (D), or the major proportion of constituent (D), in the mixture (1), and
(3) dispersing constituent (E) in the mixture (2).

The coating materials of the invention are outstandingly suitable for producing coatings of all kinds. In particular they are suitable for use as coil coating materials. They are also suitable, outstandingly, for producing coatings on all utility metals, particularly on bright steel, galvanized, electrolytically zincked, and phosphated steel, zinc and aluminum, on coatings, especially primer coats, and on SMC (sheet molded compounds) and BMC (bulk molded compounds). The coatings of the invention are outstandingly suitable here as clear coats, topcoats, temporary or permanent protective coats, primer coats, sealing coats, and antifingerprint coats, but especially as topcoats.

In terms of method the application of the coating material of the inventions has no peculiarities but can instead take place by all customary application methods, such as spraying, knife coating, brushing, pouring, dipping, trickling or rolling, for example. In general it is advisable to operate in the absence of actinic radiation in order to prevent premature crosslinking of the coating materials of the invention. Following application, any water present in the coating material of the invention can be evaporated off easily, this also being referred to as flash-off. Preferably this is done by brief inductive heating of the metal substrates.

Particularly suitable sources for curing the applied coating materials of the invention with actinic radiation include electron beam sources, as described for example in A. Goldschmidt and H.-J. Streitberger, BASF-Handbuch Lackiertechnik, Vincentz Verlag, Hannover, 2002, pages 638 to 641, or in Römpp Lexikon Lacke und Druckfarben, Georg Thieme Verlag, Stuttgart N.Y., 1998, "Electron beam sources", "Electron beam curing" and "Electron beams".

For the irradiation it is preferred to use a radiation dose of 10 to 200, more preferably 20 to 100, and in particular 30 to 80 kilograys. Irradiation is carried out preferably under inert gas, especially under nitrogen or noble gas.

The radiation intensity here can vary widely. It is guided in particular by the radiation dose, on the one hand, and the period of irradiation, on the other. For a given radiation dose, the irradiation period is guided by the belt speed or rate of advance of the substrates in the irradiation unit, and vice versa.

It is a particular advantage of the coating material of the invention that it can be applied even to an only part-cured primer film which is curable with actinic radiation, after which all applied films are cured jointly with actinic radiation. This produces a further shortening in operating times, and the intercoat adhesion is further improved. Overall, by virtue of the use of the coating material of the invention, it is no longer necessary in the case of the coil coating process to heat the metal sheets to PMT (peak metal temperatures) of 240° C. or more. Also superfluous are the suction withdrawal and disposal of volatile organic compounds, thereby allowing significant reductions in the cost and complexity associated with apparatus, safety technology, and energy.

The resultant coatings of the invention are highly flexible, very hard, can be deformed very substantially, without damage, are resistant to chemicals, weathering, condensation, and salt water, and adhere well to the substrates and other coatings. In conjunction with all of these features they also impart an outstanding visual impression.

EXAMPLES

Example 1

The Preparation of Coating Material 1

Coating material 1 was first prepared by preparing a mixture (1) of 19 parts by weight of phenyl glycidyl ether monoacrylate (CN 131B from Cray Valley), 19 parts by weight of lauryl glycidyl ether monoacrylate (CN 152 from Cray Valley), 26 parts by weight of a bifunctional polyester acrylate (Craynor® 704 from Sartomer Europe), 2 parts by weight of a polyphosphoric ester of 4-hydroxybutyl acrylate (prepared by reacting 80 parts by weight of 4-hydroxybutyl acrylate and 20 parts by weight of polyphosphoric acid with a diphosphorus pentoxide content of 84% by weight; excess of 4-hydroxybutyl acrylate: 20% by weight), 2 parts by weight of a mixture of isobornyl acrylate and N-2-hydroxyethylimidazole methacrylate with a weight ratio of 1.2:1, 0.05 part by weight of a devolatizer (Versaflow® from Shamrock) and 1.5 parts by weight of an actinic-radiation-curable polysiloxane additive (DC 18 from Dow Corning) and homogenizing the mixture in an Ultraturrax for 30 minutes at a speed of 1800.

The resulting mixture (1) was admixed in the Ultraturrax with 23.85 parts by weight of titanium dioxide pigment (Tioxide® TR 81) and 1.1 parts by weight of a micronized, PTFE-modified polyethylene wax (Polyfluo® 400×F from Micropowder) and then homogenized, giving mixture (2).

Mixture (2) was admixed in the Ultraturrax with 7.5 parts by weight of a matting agent (Silcron® G602, amorphous silica from the company SMC) and homogenized, giving mixture (3), or coating material 1.

Coating material 1 was fully stable on storage in the absence of actinic radiation for several months. It showed no thixotropic behavior. It was outstandingly suitable for producing topcoats by means of the coil coating process.

Example 2

The Preparation of Coating Material 2

Coating material 2 was first prepared by preparing a mixture (1) of 17.4 parts by weight of phenyl glycidyl ether monoacrylate (CN 131B from Cray Valley), 17.4 parts by weight of lauryl glycidyl ether monoacrylate (CN 152 from Cray Valley), 23.2 parts by weight of a bifunctional polyester acrylate (Craynor® 704 from Sartomer Europe), 2.5 parts by weight of a polyphosphoric ester of 4-hydroxybutyl acrylate (prepared by reacting 80 parts by weight of 4-hydroxybutyl acrylate and 20 parts by weight of polyphosphoric acid with a diphosphorus pentoxide content of 84% by weight; excess of 4-hydroxybutyl acrylate: 20% by weight), 5.5 parts by weight of a mixture of isobornyl acrylate and N-2-hydroxyethylimidazole methacrylate with a weight ratio of 1.2:1, and 1.5 parts by weight of an actinic-radiation-curable polysiloxane additive (BY16-562 from Dow Corning) and homogenizing the mixture in an Ultraturrax for 30 minutes at a speed of 1800.

The resulting mixture (1) was admixed in the Ultraturrax with 24 parts by weight of titanium dioxide pigment (Tioxide® TR 81) and 1.1 parts by weight of a micronized, PTFE-modified polyethylene wax (Polyfluo® 400×F from Micropowder) and then homogenized, giving mixture (2).

Mixture (2) was admixed in the Ultraturrax with 7.5 parts by weight of a matting agent (Silcron® G602, amorphous silica from the company SMC) and homogenized, giving mixture (3), or coating material 2.

Coating material 2 was fully stable on storage in the absence of actinic radiation for several months. It showed no thixotropic behavior. It was outstandingly suitable for producing topcoats by means of the coil coating process.

Examples 3 to 5

The Preparation of Coating Materials 3 to 5

Example 1 was repeated but replacing the bifunctional polyester acrylate (Craynor® 704 from Sartomer Europe)
  in example 3 by a mixture of the polyurethane acrylates Photomer® 6613 from Cognis and Roskydal® 4084 from Bayer Aktiengesellschaft;
  in example 4 by a mixture of the polyurethane acrylates Roskydal® 4083 and 4084 from Bayer Aktiengesellschaft; and
  in example 5 by a mixture of the polyurethane acrylates Photomer® 6613 from Cognis and RCP4698 from Akzo;

used in each case in a weight ratio of 1:1.

Coating materials 3 to 5 were fully stable on storage in the absence of actinic radiation for several months. They showed no thixotropic behavior. They were outstandingly suitable for producing topcoats by means of the coil coating process.

Examples 6 to 8

The Preparation of Coating Materials 6 to 8

Example 2 was repeated but replacing the bifunctional polyester acrylate (Craynor® 704 from Sartomer Europe)
  in example 6 by a mixture of the polyurethane acrylates Photomer® 6613 from Cognis and Roskydal® 4084 from Bayer Aktiengesellschaft;
  in example 7 by a mixture of the polyurethane acrylates Roskydal® 4083 and 4084 from Bayer Aktiengesellschaft; and
  in example 8 by a mixture of the polyurethane acrylates Photomer® 6613 from Cognis and RCP4698 from Akzo;

used in each case in a weight ratio of 1:1.

Coating materials 6 to 8 were fully stable on storage in the absence of actinic radiation for several months. They showed no thixotropic behavior. They were outstandingly suitable for producing topcoats by means of the coil coating process.

Examples 9 and 10

The Production of Color Paint Systems 1 and 2, Comprising a Primer Coat and a Topcoat 1 and 2, with the Aid of Coating Materials 1 and 2 from Examples 1 and 2

For example 9, coating material 1 from example 1 was used.

For example 10, coating material 2 from example 2 was used.

The substrates used were unpretreated HDG (hot dipped galvanized) steel panels Z280 from Chemetall.

To produce the primer coated a primer was first prepared from 33.25 parts by weight of phenyl glycidyl ether monoacrylate (CN 131B from Cray Valley), 22.8 parts by weight of lauryl glycidyl ether monoacrylate (CN 152 from Cray Valley), 1.12 parts by weight of polypropylene glycol monoacrylate (PAM 300 from Rhodia), 1.12 parts by weight of an epoxy resin (Epikote® 862), 5.82 parts by weight of water, 2.91 parts by weight of a polyphosphoric ester of 4-hydroxybutyl acrylate (prepared by reacting 80 parts by weight of 4-hydroxy butyl acrylate and 20 parts by weight of polyphosphoric acid with a diphosphorus pentoxide content of 84% by weight; excess of 4-hydroxybutyl acrylate: 20% by weight), 1.68 parts by weight of low-viscosity polyvinyl butyral (Pioloform® BN 18 from Wacker), 18.5 parts by weight of aluminum polyphosphate pigment (Targon® WA 2886 from BK Giulini), 6 parts by weight of nanoparticles based on silica (Nyasil® 6200 from Nyacol Nano Technologies), and 9 parts by weight of titanium dioxide pigment (Tioxide® TR 81). The mixture was homogenized in an Ultraturrax for 20 minutes at a speed of 1800/min.

The primer was applied in a film thickness of 6 to 7 µm to the substrates. The water contained therein was evaporated over the course of one minute at 125° C. The resulting primer film was cured with electron beams (50 kilograys) under nitrogen, giving the primer coat.

Coating materials 1 and 2 from examples 1 and 2 were applied with an average film thickness of 21 µm to the primer coats at 40° C. in the absence of actinic radiation. The resulting topcoat films 1 and 2 were heated in a forced-air oven at 120° C. for 30 seconds, giving a topcoat film 1 and 2 surface temperature of 50° C. Thereafter the topcoat films 1 and 2 were cured with electron beams (65 kilograys) under nitrogen, giving topcoats 1 and 2.

Topcoats 1 and 2 fully met the ECCA standard of class 6 (T-Bend-Test: 1.5; Tape-Test: 0). They had the pencil hardness HB. Their gloss (60°) was 28% to 32% (topcoat 1) and 34% to 36% (topcoat 2). In the salt spray test they exhibited no corrosion at the scribe mark even after 504 hours. They were solvent-resistant (double rubs with an impregnated cotton pad: alcohol 100, xylene 80, ethyl acetate 60) and stable to weathering.

Examples 11 to 16

The Production of Color Paint Systems 3 to 8, Comprising a Primer Coat and in Each Case One of Topcoats 3 to 8, with the Aid of Coating Materials 3 to 8 from Examples 3 to 8

For examples 11 to 13, example 9 was repeated, but using, instead of coating material 1 from example 1,
  in example 11, coating material 3 from example 3;
  in example 12, coating material 4 from example 4; and
  in example 13, coating material 5 from example 5.

For examples 14 to 16, example 10 was repeated, but using, instead of coating material 2 from example 2,
  in example 14, coating material 6 from example 6;
  in example 15, coating material 7 from example 7; and
  in example 16, coating material 8 from example 8.

The resulting color paint systems 3 to 8 of examples 11 to 16 had the same advantageous properties as the color paint systems 1 and 2 from examples 9 and 10.

What is claimed is:

1. A liquid coating material curable with actinic radiation, comprising
(A) at least two compounds of the general formula I:

X—O—Y(—OH)—Z-Gr     (I), wherein:
X is an aromatic radical of 6 to 14 carbon atoms, a heterocyclic aromatic radical of 5 to 20 ring atoms or an alkyl radical of 6 to 30 carbon atoms,
Y is a trivalent organic radical,
Z is a linking functional group, and
Gr is an organic radical comprising at least one group which can be activated with actinic radiation;
with the proviso that at least one compound (A1) of the at least two compounds (A) comprises an aromatic or a heterocyclic aromatic radical X and at least one compound (A2) of the at least two compounds (A) comprises an alkyl radical X;
(B) at least one oligomer, polymer, or a combination thereof, which can be activated with actinic radiation and is selected from the group consisting of oligourethanes, polyurethanes, oligoesters, polyesters, and a combination thereof, comprising at least two groups which can be activated with actinic radiation;
(C) at least one constituent selected from the group consisting of color pigments, effect pigments, and a combination thereof;
(D) at least one wax;
(E) at least one matting agent; and
(F) at least one polysiloxane additive comprising at least one group which can be activated with actinic radiation, wherein the liquid coating material has less than 5% organic solvent content by weight.

2. The coating material as claimed in claim 1, wherein the radical X of (A1) is an aromatic radical of 6 to 10 carbon atoms.

3. The coating material as claimed in claim 1, wherein the radical X of (A2) is a straight-chain alkyl radical of 10 to 20 carbon atoms.

4. The coating material as claimed in claim 1, wherein the trivalent organic radical Y is an aliphatic radical of 3 to 6 carbon atoms.

5. The coating material as claimed in claim 1, wherein the linking functional group Z is a carboxylic ester group linked to the radicals Y and Gr in accordance with the general formula II:

>Y—O—(O=)C-Gr     (II).

6. The coating material as claimed in claim 1, wherein the organic radical Gr comprises a group which can be activated with actinic radiation.

7. The coating material as claimed in claim 1, comprising, based on its total amount, 5% to 30% by weight (A1).

8. The coating material as claimed in claim 1, comprising, based on its total amount, 5% to 30% by weight (A2).

9. The coating material as claimed in claim 1, wherein the oligomer or polymer (B) which can be activated with actinic radiation comprises two or three groups which can be activated with actinic radiation.

10. The coating material as claimed in claim 1, comprising, based on its total amount, 10% to 50% by weight (B).

11. The coating material as claimed in claim 1, wherein the pigment (C) is selected from the group consisting of organic pigments, inorganic pigments, colored pigments, achromatic pigments, optical effect pigments, electrically conductive pigments, magnetically shielding pigments, and fluorescent pigments.

12. The coating material as claimed in claim 1, wherein the wax (D) is selected from the group consisting of micronized polyolefin waxes and fluorinated polyolefin waxes.

13. The coating material as claimed in claim 1, comprising, based on its total amount, 0.1% to 3% by weight (D).

14. The coating material as claimed in claim 1, wherein the matting agent (E) is an amorphous silica.

15. The coating material as claimed in claim 1, comprising, based on its total amount, 1% to 15% by weight (E).

16. The coating material as claimed in claim 1, wherein the polysiloxane additive (F) comprises at least two groups which can activated with actinic radiation.

17. The coating material as claimed in claim 1, wherein the coating material further comprises at least one reactive diluent (G) comprising at least one group which can be activated with actinic radiation.

18. The coating material as claimed in claim 1, wherein the coating material further comprises at least one acidic ester (H) of polyphosphoric acid and at least one compound (h1) comprising at least one hydroxyl group and at least one group which can be activated with actinic radiation.

19. The coating material as claimed in claim 1, wherein the groups which can be activated with actinic radiation are olefinically unsaturated double bonds.

20. The coating material as claimed in claim 1, wherein the actinic radiation is electron beams.

21. The coating material as claimed in claim 1, wherein the coating material further comprises at least one additive (J) selected from the group consisting of water; polyphosphoric acid; phosphonic acids comprising at least one group which can be activated with actinic radiation; acidic esters of monophosphoric acid and at least one compound comprising at least one hydroxyl group and at least one group which can be activated with actinic radiation (h1); dryers; transparent and opaque, organic and inorganic fillers; nanoparticles; thermally or physically curable, oligomeric and polymeric binders; UV absorbers; light stabilizers; free-radical scavengers; photoinitiators; devolatilizers; slip additives; polymerization inhibitors; defoamers; emulsifiers; wetting agents; adhesion promoters; flow control agents; film-forming auxiliaries; rheology control additives; and flame retardants.

22. A process for preparing a coating material as claimed in claim 1, comprising mixing constituents (A) to (F) with one another and homogenizing the resulting mixture.

23. The process as claimed in claim 22, comprising
(1) preparing a mixture comprising constituents (A), (B) and (F) and, optionally, a small fraction of constituent (D),
(2) dispersing in the mixture (1), constituent (C) and constituent (D), or constituent (C) and a the major fraction of constituent (D) when the small fraction of constituent (D) is optionally mixed with (A), (B), and (F), and
(3) dispersing constituent (E) in the mixture (2).

24. A coil coating comprising the coating material as claimed in claim 1.

25. The coil coating as claimed in claim 24, wherein the coil coating is a topcoats.

* * * * *